US007116242B2

(12) United States Patent  (10) Patent No.: US 7,116,242 B2
Guthrie  (45) Date of Patent: *Oct. 3, 2006

(54) PROGRAMMABLE TRANSMITTER AND RECEIVER INCLUDING DIGITAL RADIO FREQUENCY MEMORY

(75) Inventor: Warren E. Guthrie, West Olive, MI (US)

(73) Assignee: Lear Corporation, Southfield, MI (US)

( * ) Notice: Subject to any disclaimer, the term of this patent is extended or adjusted under 35 U.S.C. 154(b) by 495 days.

This patent is subject to a terminal disclaimer.

(21) Appl. No.: 10/306,077

(22) Filed: Nov. 27, 2002

(65) Prior Publication Data

US 2004/0100391 A1  May 27, 2004

(51) Int. Cl.
*H04Q 1/00* (2006.01)

(52) U.S. Cl. ............... 340/825.22; 340/5.25; 340/5.61; 340/5.71; 340/825.69

(58) Field of Classification Search ............. 340/5.71, 340/5.62, 825.22, 825.69, 5.61, 5.25; 341/176
See application file for complete search history.

(56) References Cited

U.S. PATENT DOCUMENTS

| | | | |
|---|---|---|---|
| 1,522,241 A | 1/1925 | Hennessey |
| 3,098,212 A | 7/1963 | Creamer, Jr. |
| 3,300,867 A | 1/1967 | Sampson |
| 3,337,992 A | 8/1967 | Tolson |
| 3,456,387 A | 7/1969 | Tolson |
| 3,680,951 A | 8/1972 | Jordan et al. |
| 4,074,200 A | 2/1978 | Buchta |
| 4,167,833 A | 9/1979 | Farina et al. |
| 4,178,549 A | 12/1979 | Ledenbach et al. |
| 4,219,812 A | 8/1980 | Rittenbach |
| 4,241,870 A | 12/1980 | Marcus |
| 4,247,850 A | 1/1981 | Marcus |
| 4,425,717 A | 1/1984 | Marcus |
| 4,447,808 A | 5/1984 | Marcus |
| 4,453,161 A | 6/1984 | Lemelson |
| 4,482,947 A | 11/1984 | Zato et al. |
| 4,529,980 A | 7/1985 | Liotine et al. |
| 4,535,333 A | 8/1985 | Twardowski |
| 4,581,827 A | 4/1986 | Higashi |
| 4,595,228 A | 6/1986 | Chu |
| 4,598,287 A | 7/1986 | Osakabe et al. |
| 4,623,887 A | 11/1986 | Welles, II |
| 4,631,708 A | 12/1986 | Wood et al. |
| 4,635,033 A | 1/1987 | Inukai et al. |
| 4,638,433 A | 1/1987 | Schindler |
| 4,665,397 A | 5/1987 | Pinnow |
| 4,676,601 A | 6/1987 | Itoh et al. |

(Continued)

FOREIGN PATENT DOCUMENTS

EP  0 670 402 A1  9/1995

(Continued)

OTHER PUBLICATIONS

Combined Search and Examination Report Under Sections 17 and 18(3) mailed Nov. 2, 2004 for European patent application GB 0416789.6.

(Continued)

*Primary Examiner*—Edwin C. Holloway, III
(74) *Attorney, Agent, or Firm*—Brooks Kushman P.C.

(57) ABSTRACT

A vehicular programmable transceiver includes a digital radio frequency memory (DRFM) having at least one register configured to sample and hold a radio frequency input signal in response to a clock signal and to generate an output signal having a carrier frequency generated in response to the sampled and held input signal.

37 Claims, 3 Drawing Sheets

U.S. PATENT DOCUMENTS

| | | | |
|---|---|---|---|
| 4,700,327 A * | | 10/1987 | Hilton ............................ 369/6 |
| 4,706,299 A | | 11/1987 | Jorgensen |
| 4,707,788 A | | 11/1987 | Tashiro et al. |
| RE32,576 E | | 1/1988 | Pastore |
| 4,727,302 A | | 2/1988 | Mizuta et al. |
| 4,743,905 A | | 5/1988 | Wiegand |
| 4,747,159 A | | 5/1988 | Kato |
| 4,750,118 A | | 6/1988 | Heitschel et al. |
| 4,754,255 A | | 6/1988 | Sanders et al. |
| 4,771,283 A | | 9/1988 | Imoto |
| 4,793,690 A | | 12/1988 | Gahan et al. |
| 4,799,189 A * | | 1/1989 | Grover ........................ 369/61 |
| 4,806,930 A | | 2/1989 | Wojciak, Jr. |
| 4,825,200 A | | 4/1989 | Evans et al. |
| 4,881,148 A | | 11/1989 | Lambropoulos et al. |
| 4,882,565 A | | 11/1989 | Gallmeyer |
| 4,886,960 A | | 12/1989 | Molyneux et al. |
| 4,890,108 A | | 12/1989 | Drori et al. |
| 4,896,030 A | | 1/1990 | Miyaji |
| 4,905,279 A | | 2/1990 | Nishio |
| 4,912,463 A | | 3/1990 | Li |
| 4,917,477 A | | 4/1990 | Bechtel et al. |
| 4,953,305 A | | 9/1990 | Van Lente et al. |
| 4,978,944 A | | 12/1990 | Andros et al. |
| 4,988,992 A | | 1/1991 | Heitschel et al. |
| 5,016,996 A | | 5/1991 | Ueno |
| 5,064,274 A | | 11/1991 | Alten |
| 5,085,062 A | | 2/1992 | Capdevila |
| 5,103,221 A | | 4/1992 | Memmola |
| 5,109,222 A | | 4/1992 | Welty |
| 5,113,821 A | | 5/1992 | Fukui et al. |
| 5,122,647 A | | 6/1992 | Lynam et al. |
| 5,123,008 A | | 6/1992 | Beesley |
| 5,126,686 A | | 6/1992 | Tam |
| 5,146,215 A | | 9/1992 | Drori |
| 5,154,617 A | | 10/1992 | Suman et al. |
| 5,181,423 A | | 1/1993 | Philipps et al. |
| 5,191,610 A | | 3/1993 | Hill et al. |
| 5,193,210 A | | 3/1993 | Nicholas et al. |
| 5,201,067 A | | 4/1993 | Grube et al. |
| 5,225,847 A | | 7/1993 | Roberts et al. |
| 5,243,322 A | | 9/1993 | Thompson et al. |
| 5,252,960 A | | 10/1993 | Duhame |
| 5,252,977 A | | 10/1993 | Lueker et al. |
| 5,266,945 A | | 11/1993 | Peek et al. |
| 5,278,547 A | | 1/1994 | Suman et al. |
| 5,369,706 A | | 11/1994 | Latka |
| 5,379,453 A | | 1/1995 | Tigwell |
| 5,402,105 A | | 3/1995 | Doyle et al. |
| 5,408,698 A | | 4/1995 | Serizawa et al. |
| 5,412,379 A | | 5/1995 | Waraksa et al. |
| 5,420,925 A | | 5/1995 | Michaels |
| 5,442,340 A | | 8/1995 | Dykema |
| 5,455,716 A | | 10/1995 | Suman et al. |
| 5,463,374 A | | 10/1995 | Mendez et al. |
| 5,471,668 A | | 11/1995 | Soenen et al. |
| 5,473,317 A | | 12/1995 | Inomata et al. |
| 5,475,366 A | | 12/1995 | Van Lente et al. |
| 5,479,155 A | | 12/1995 | Zeinstra et al. |
| 5,517,187 A | | 5/1996 | Bruwer et al. |
| 5,528,230 A | | 6/1996 | Kim |
| 5,554,977 A | | 9/1996 | Jablonski, Jr. |
| RE35,364 E | | 10/1996 | Heitschel et al. |
| 5,564,101 A | | 10/1996 | Eisfeld et al. |
| 5,583,485 A | | 12/1996 | Van Lente et al. |
| 5,594,429 A | | 1/1997 | Nakahara |
| 5,596,316 A | | 1/1997 | Honeck |
| 5,598,475 A | | 1/1997 | Soenen et al. |
| 5,613,732 A | | 3/1997 | Demick |
| 5,614,885 A | | 3/1997 | Van Lente et al. |
| 5,614,891 A | | 3/1997 | Zeinstra et al. |
| 5,619,190 A | | 4/1997 | Duckworth et al. |
| 5,627,529 A | | 5/1997 | Duckworth et al. |
| 5,645,308 A | | 7/1997 | Fink |
| 5,646,701 A | | 7/1997 | Duckworth et al. |
| 5,661,455 A | | 8/1997 | Van Lente et al. |
| 5,661,651 A | | 8/1997 | Geschke et al. |
| 5,661,804 A | | 8/1997 | Dykema et al. |
| 5,680,131 A | | 10/1997 | Utz |
| 5,680,134 A * | | 10/1997 | Tsui ........................ 341/173 |
| 5,686,903 A | | 11/1997 | Duckworth et al. |
| 5,686,904 A | | 11/1997 | Bruwer |
| 5,691,848 A | | 11/1997 | Van Lente et al. |
| 5,699,044 A | | 12/1997 | Van Lente et al. |
| 5,699,054 A | | 12/1997 | Duckworth |
| 5,699,055 A | | 12/1997 | Dykema et al. |
| 5,708,415 A | | 1/1998 | Van Lente et al. |
| 5,715,020 A | | 2/1998 | Kuroiwa et al. |
| 5,731,756 A | | 3/1998 | Roddy |
| 5,751,224 A | | 5/1998 | Fitzgibbon |
| 5,793,300 A | | 8/1998 | Suman et al. |
| 5,812,097 A | | 9/1998 | Maldonado |
| 5,831,548 A | | 11/1998 | Fitzgibbon |
| 5,838,255 A | | 11/1998 | Di Croce |
| 5,841,253 A | | 11/1998 | Fitzgibbon et al. |
| 5,841,390 A | | 11/1998 | Tsui |
| 5,841,813 A | | 11/1998 | van Nee |
| 5,845,593 A | | 12/1998 | Birkestrand |
| 5,854,593 A | | 12/1998 | Dykema et al. |
| 5,872,513 A | | 2/1999 | Fitzgibbon et al. |
| 5,903,226 A | | 5/1999 | Suman et al. |
| 5,926,087 A | | 7/1999 | Busch et al. |
| 5,926,106 A | | 7/1999 | Beran et al. |
| 5,940,000 A | | 8/1999 | Dykema |
| 5,940,007 A | | 8/1999 | Brinkmeyer |
| 5,940,120 A | | 8/1999 | Frankhouse et al. |
| 5,949,349 A | | 9/1999 | Farris et al. |
| 6,002,332 A | | 12/1999 | King |
| 6,005,508 A | | 12/1999 | Tsui |
| 6,008,735 A | | 12/1999 | Chiloyan et al. |
| 6,009,355 A | | 12/1999 | Obradovich et al. |
| 6,021,319 A | | 2/2000 | Tigwell |
| 6,025,785 A | | 2/2000 | Farris et al. |
| 6,031,465 A | | 2/2000 | Burgess |
| 6,043,753 A | | 3/2000 | Okayasu et al. |
| 6,049,289 A | | 4/2000 | Waggamon et al. |
| 6,055,508 A | | 4/2000 | Naor et al. |
| RE36,703 E | | 5/2000 | Heitschel et al. |
| 6,072,436 A | | 6/2000 | Marougi |
| 6,078,271 A | | 6/2000 | Roddy et al. |
| 6,081,203 A | | 6/2000 | Fitzgibbon |
| 6,091,343 A | | 7/2000 | Dykema et al. |
| 6,104,101 A | | 8/2000 | Miller et al. |
| 6,127,740 A | | 10/2000 | Roddy et al. |
| 6,130,625 A | | 10/2000 | Harvey |
| 6,131,019 A | | 10/2000 | King |
| 6,137,421 A | | 10/2000 | Dykema |
| 6,154,544 A | | 11/2000 | Farris et al. |
| 6,166,650 A | | 12/2000 | Bruwer |
| 6,175,312 B1 | | 1/2001 | Bruwer et al. |
| 6,181,255 B1 | | 1/2001 | Crimmins et al. |
| 6,191,701 B1 | | 2/2001 | Bruwer |
| 6,243,000 B1 | | 6/2001 | Tsui |
| 6,249,673 B1 | | 6/2001 | Tsui |
| 6,271,765 B1 | | 8/2001 | King et al. |
| 6,282,152 B1 | | 8/2001 | Kurple |
| 6,308,083 B1 | | 10/2001 | King |
| 6,320,514 B1 | | 11/2001 | Flick |
| 6,333,698 B1 | | 12/2001 | Roddy |
| 6,344,817 B1 | | 2/2002 | Verzulli |
| 6,359,558 B1 | | 3/2002 | Tsui |
| 6,362,771 B1 | | 3/2002 | Schofield et al. |
| 6,397,058 B1 | | 5/2002 | Thibert et al. |
| 6,414,587 B1 | | 7/2002 | Fitzgibbon |

| | | |
|---|---|---|
| 6,441,719 B1 | 8/2002 | Tsui |
| 6,486,795 B1 | 11/2002 | Sobel et al. |
| RE37,986 E | 2/2003 | Heitschel et al. |
| 6,525,645 B1 | 2/2003 | King et al. |
| 6,542,076 B1 | 4/2003 | Joao |
| 6,556,681 B1 | 4/2003 | King |
| 6,556,813 B1 | 4/2003 | Tsui |
| 6,559,775 B1 | 5/2003 | King |
| 6,597,291 B1 | 7/2003 | Tsui |
| 6,634,408 B1 | 10/2003 | Mays |
| 6,661,350 B1 | 12/2003 | Rohrberg et al. |
| 6,690,796 B1 | 2/2004 | Farris et al. |
| 6,703,941 B1 | 3/2004 | Blaker |
| 6,759,350 B1 | 7/2004 | Tsai |
| 6,791,467 B1 | 9/2004 | Ben Ze'ev |
| 6,810,123 B1 | 10/2004 | Farris et al. |
| 6,822,603 B1 | 11/2004 | Crimmins et al. |
| 6,903,650 B1 | 6/2005 | Murray |
| 6,956,460 B1 | 10/2005 | Tsui |
| 6,963,267 B1 | 11/2005 | Murray |
| 6,975,203 B1 | 12/2005 | Brookbank et al. |
| 2002/0034303 A1 | 3/2002 | Farris et al. |
| 2002/0067826 A1 | 6/2002 | King |
| 2002/0075133 A1 | 6/2002 | Flick |
| 2002/0126037 A1 | 9/2002 | Fitzgibbon |
| 2002/0137479 A1 | 9/2002 | Tsui |
| 2002/0140569 A1 | 10/2002 | van Ee et al. |
| 2002/0163440 A1 | 11/2002 | Tsui |
| 2002/0190872 A1 | 12/2002 | Suman et al. |
| 2002/0191794 A1 | 12/2002 | Farris et al. |
| 2002/0197955 A1 | 12/2002 | Witkowski et al. |
| 2003/0016119 A1 | 1/2003 | Teich |
| 2003/0016139 A1 | 1/2003 | Teich |
| 2003/0033540 A1 | 2/2003 | Fitzgibbon |
| 2003/0067394 A1 | 4/2003 | Tsui |
| 2003/0076235 A1 | 4/2003 | Tsui |
| 2003/0085798 A1 | 5/2003 | Esteban |
| 2003/0118187 A1 | 6/2003 | Fitzgibbon |
| 2003/0189530 A1 | 10/2003 | Tsui |
| 2003/0197594 A1 | 10/2003 | Olson et al. |
| 2003/0197595 A1 | 10/2003 | Olson et al. |
| 2003/0216139 A1 | 11/2003 | Olson et al. |
| 2003/0228879 A1 | 12/2003 | Witkowski et al. |
| 2004/0048622 A1 | 3/2004 | Witkowski et al. |
| 2004/0061591 A1 | 4/2004 | Teich |
| 2004/0066936 A1 | 4/2004 | Farris et al. |
| 2004/0110472 A1 | 6/2004 | Witkowski et al. |
| 2004/0243813 A1 | 12/2004 | Farris et al. |
| 2005/0024184 A1 | 2/2005 | Chuey |
| 2005/0024185 A1 | 2/2005 | Chuey |
| 2005/0024229 A1 | 2/2005 | Chuey |
| 2005/0024230 A1 | 2/2005 | Chuey |
| 2005/0024255 A1 | 2/2005 | Chuey |
| 2005/0025254 A1 | 2/2005 | Chuey |
| 2005/0026601 A1 | 2/2005 | Chuey |
| 2005/0026602 A1 | 2/2005 | Chuey et al. |
| 2005/0026605 A1 | 2/2005 | Guthrie et al. |

FOREIGN PATENT DOCUMENTS

| | | |
|---|---|---|
| GB | 2171545 A | 8/1986 |
| GB | 2 182 790 A | 10/1986 |
| GB | 2 182 790 A | 5/1987 |
| GB | 2 302 751 A | 6/1996 |
| GB | 2 336 433 | 4/1999 |
| GB | 2335773 A | 9/1999 |
| GB | 2 366 433 | 5/2000 |
| WO | WO 94/02920 | 7/1993 |
| WO | WO 94/02920 | 2/1994 |
| WO | WO 00/29699 | 5/2000 |

OTHER PUBLICATIONS

Combined Search and Examination Report Under Sections 17 and 18(3) mailed Nov. 2, 2004 for European patent application GB0416753.2.

Combined Search and Examination Report Under Sections 17 and 18(3) for European Application No. GB0416742.5 dated Oct. 26, 2004.

German Search/Examination Document, German Patent Application No. 103 14 228.2, Dec. 14, 2004.

Combined Search and Examination Report Under Sections 17 and 18(3) mailed Nov. 30, 2004 for the corresponding European patent application GB 0415908.3.

Garage Door/Gate Remote Control User's Instructions (Model 39), Skylink Technologies Inc., 2002.

HomeLink Wireless Control System Lighting Kit Installation, http://www.homelink.com/print/lighting_print.html.

HomeLink Wireless Control System Frequently Asked Questions, http://www.homelink.com/print/faq_print.html.

HomeLink Universal 2 Channel Receiver Model PR433-2, Installation Instructions, 114A2437, 2000.

Getting Started with HomeLink, Programming Garage Door Openers and Gates.

HomeLink Universal Transceiver Lighting Package Programming.

Microchip HCS360 Keeloq Code Hopping Encoder, Microchip Technology Inc., DS40152E, 2002.

Microchip TB003, An Introduction to Keeloq Code Hopping, Microchip Technology Inc., DS91002A, 1996.

Chamberlain LiftMaster Professional Universal Receiver Model 635LM Owner's Manual, 114A2128C, The Chamberlain Group, Inc., 2002.

Flash2Pass eliminates past garage door operner hassles using a secure and easy-to-install system, Press Release, F2P Electronics, Inc., Jan. 2002.

Flash2Pass Easy Set Up Instructions, v031003, F2P Technologies.

The X-10 Powerhouse Power Line Interface Model #PL513 and Two-Way Power Line Interface Model #TW523, Technical Note, Dave Rye, Rev. 2.4, PL/TWTN/1291.

Neural Networks for ECCM, Simon Haykin, McMaster University Communications Research Laboratory Technical Report 282, Neurocomputing for Signal Processing, Feb. 1994, http://www.crl.mcmaster.ca/cgi-bin/makerabs.pl?282.

DRFM Theory of Operation, KOR Electronics, Inc., http://www.korelectronics.com/product_sheets/theory-of-operations/drfm-theoryofop.htm.

Fabrication Process Combines Low Cost and High Reliability, Murat Eron, Richard J. Perko and R. James Gibson, Microwaves & RF, Oct. 1993.

Pager and Garage Door Opener Combination, Gail Marino, Motorola Technical Developments, vol. 10, Mar. 1990.

Search and Examination Report under Sections 17 and 18(3), Sep. 25, 2003.

Marino, Gail, Pager and Garage Door Opener Combination, Motorola Technical Developments, vol. 10, p. 36, Mar. 1990.

Murat Eron, Richard J. Perko, and R. James Gibson, Fabrication Process Combines Low Cost and High Reliability, Microwaves & RF, Oct. 1993, pp. 61-68.

KOR Electronics, Inc., DRFM Theory of Operation, www.korelectronics.com/product_sheets/theory-of-operations/drfm-theoryofop.htm.

Haykin, Simon, Neural Networks for ECCM, McMaster University Communications Research Laboratory Technical Report 282, Feb. 1994, www.crl.mcmaster.ca/cgi-bin/makerabs.pl?282.

* cited by examiner

PROGRAMMABLE TRANSMITTER AND RECEIVER INCLUDING DIGITAL RADIO FREQUENCY MEMORY

BACKGROUND OF THE INVENTION

1. Field of the Invention

The present invention relates to programmable transmitters and receivers.

2. Background Art

Electrically operated appliances such as garage door opening (and closing) mechanisms are an increasingly popular home convenience. Such electrically operated appliances typically implement a battery operated transmitter and receiver (i.e., transceiver) remote control that transmits an encoded radio frequency (RF) signal to a receiver in the appliance. For example, a garage door opener transceiver in a vehicle transmits the coded signal to the receiver in the garage when a driver or passenger presses a button on the transceiver. Multiple transceivers are often purchased so that a number of vehicles can access the garage. Some types of transceivers may be programmed by the owner to operate a particular garage door mechanism (i.e., the transceivers are programmed to operate with the receiver in the owner's garage). The programming typically includes receiving the control signal from a previously programmed transceiver and storing the control signal for future transmissions.

A conventional programmable transceiver is typically implemented as a number of components and/or circuits on multiple circuit boards that can result in a bulky and cumbersome transceiver. The conventional transceiver can be slow to program. The slow programming can cause user frustration and dissatisfaction. Furthermore, component drift over time and with temperature changes can cause the conventional transceiver to drift off the proper frequency. When the conventional transceiver drifts off the proper frequency, the transceiver can become non-functional until reprogrammed. The multiple component and circuit board structure of conventional transceivers can be more susceptible to breakage when dropped than a single circuit board approach.

Thus, there exists a need for a programmable transceiver that has reduced circuit board area and/or cost when compared to conventional approaches, programs more quickly, is more resistant to breakage when dropped, and is more stable over changes in temperature and over time than conventional approaches.

SUMMARY OF THE INVENTION

Accordingly, the present invention provides an improved programmable transceiver including a digital radio frequency memory where the transceiver has reduced circuit board area, quicker programming, greater resistance to breakage, and more temperature and time stability than conventional approaches.

According to the present invention, a vehicular programmable transceiver is provided comprising a digital radio frequency memory (DRFM) having at least one register configured to sample and hold a radio frequency input signal in response to a clock signal, and to generate an output signal having a carrier frequency generated in response to the sampled and held input signal.

Also according to the present invention, for use in a home appliance remote control, a programmable transceiver is provided comprising a digital radio frequency memory (DRFM) configured to hold samples of an input signal during a programming operation, and to generate an output signal having a carrier during a transmit operation, wherein the carrier is shifted out of the DRFM.

Still further according to the present invention, for use in a programmable transceiver, a method for generating an output signal is provided. The method generally comprises sampling a radio frequency input signal, holding the sampled signal in at least one buffer, shifting from the buffer a carrier signal, and controlling an amplitude of the carrier signal to generate the transceiver output signal.

Still further according to the present invention, a method of remotely controlling a garage door opener that is remotely controlled by an existing transmitter is provided, the existing transmitter transmitting a signal comprising a carrier modulated by a code, the method comprising receiving the signal, detecting the code, sampling the signal at a time determined by the detected code, storing the sampled signal, receiving a request to remotely control the garage door opener, generating a carrier approximation by playing the stored sampled signal, controlling an amplitude of the carrier approximation, and transmitting the generated carrier approximation.

Still further according to the present invention, a programmable remote garage door opener is provided comprising a receiver, a detector, a transmitter, at least one register, and control logic. The receiver may be implemented for receiving a received signal comprising a received carrier modulated with a received code. The detector may be implemented for detecting the received code in the received signal. The transmitter may be implemented for transmitting an output signal. The at least one register may be implemented for holding a plurality of samples of the received signal. The control logic may be operative to determine when the received code is detected, signal the at least one register to sample and store the received signal based on detecting the received code, receive a request to transmit a remote control command, signal the at least one register to present the stored signal to the transmitter, and signal the transmitter to control an amplitude of the stored signal presented by the at least one register thereby generating the output signal.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides an improved method and system for a programmable transmitter and receiver (i.e., transceiver) including a digital radio frequency memory. In one example, the transceiver of the present invention may be implemented in connection with a vehicular home appliance remote control such as a garage door opener/closer system remote control. However, the transceiver of the present invention may be implemented in connection with any appropriate system and apparatus to meet the design criteria of a particular application.

Figure 1:
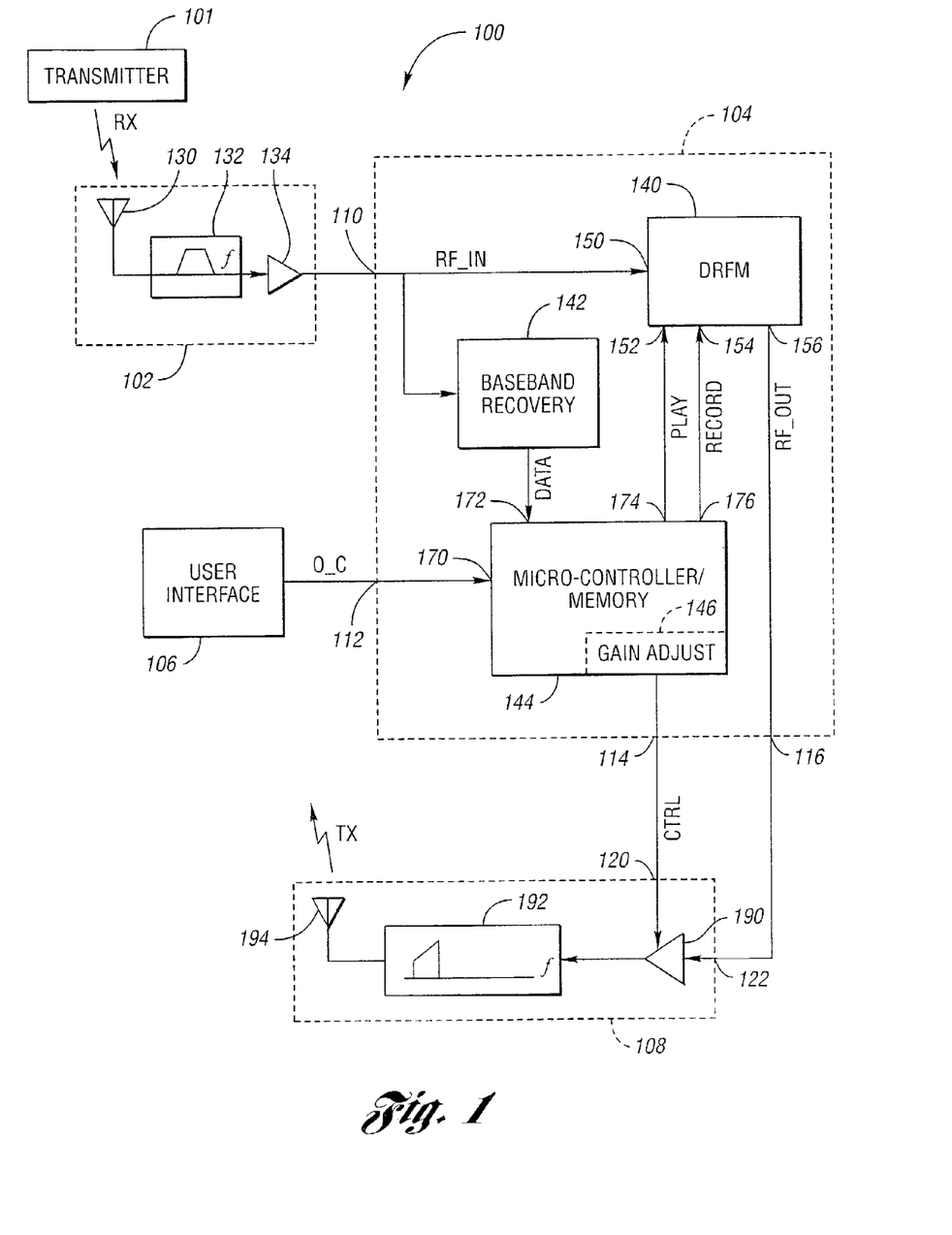
FIG. 1 is a diagram of a transceiver according to an embodiment of the present invention.

Referring to FIG. 1, a diagram illustrating a programmable transceiver 100 in accordance with a preferred embodiment of the present invention is shown. The transceiver 100 generally receives a signal (e.g., RX) in at least one mode of operation and transmits a signal (e.g., TX) in at least one other mode of operation.

The signal RX is typically an encoded radio frequency (RF) on/off key (OOK) modulated signal that is asserted to control at least one operation (e.g., opening and closing a garage door). The signal RX may, however, be implemented as a continuously amplitude modulated (AM) signal, or the like, as appropriate to meet the design criteria of a particular application. The signal RX is generally transmitted by an existing transmitter 101. The signal RX is generally transmitted to the transceiver 100 in connection with a programming operation for the transceiver 100.

The signal TX may be a control signal transmitted by the transceiver 100. The signal TX is generally similar to the signal RX. The signal TX is generally transmitted in connection with a transmit (i.e., normal) mode of operation of the transceiver 100 (e.g., when a user desires (or makes a request) to open or close a respective garage door, turn on or off at least one light, operate at least one appliance, etc.). However, other transmit and receive operations are within the scope of the present invention.

The transceiver 100 generally comprises an input or receiver circuit (or block) 102, a controller circuit (or block) 104, a user interface circuit (or block) 106, and an output or transmitter circuit (or block) 108. The input block 102 may have an input that may receive the signal RX and an output that may present a signal (e.g., RF_IN). The signal RF_IN is generally a filtered version of the signal RX.

The controller block 104 may have an input 110 that may receive the signal RF_IN, an input 112 that may receive at least one signal (e.g., O_C), an output 114 that may present a signal (e.g., CTRL), and an output 116 that may present a signal (e.g., RF_OUT). The signal O_C may be implemented as at least one control signal that is asserted to control at least one operation (e.g., programming, door opening, door closing, lights on, lights off, appliance on, appliance off, etc.) related to the transceiver 100. The signal CTRL may be implemented as an output control signal that is configured to control at least one parameter (e.g., amplitude) of an output signal that is generated by the transceiver 100 (e.g., the signal TX). The signal RF_OUT may be implemented as a radio frequency carrier or carrier signal. The signal RF_OUT is generally a carrier approximation (i.e., an approximation to the carrier that corresponds to the signal RF_IN). In an embodiment of the present invention, the signal RF_OUT is an OOK RF signal.

The user interface block 106 may have an output that may present the at least one signal O_C. The user interface 106 generally comprises at least one signal activation device such as a button switch that may activate the generation and assertion of the signal O_C in response to a user action. For example, the signal O_C may be asserted when the user pushes a button switch (not shown) on the user interface 106. The user interface 106 may further comprise at least one indicator (not shown) such as an LED that may indicate when the signal O_C is asserted, modes of operation of the transceiver 100, etc.

The output block 108 may have an input 120 that may receive the signal CTRL, an input 122 that may receive the signal RF_OUT, and an output that may present the signal TX. In one embodiment, the signal TX is a modulated and filtered version of the signal RF_OUT. In another embodiment, the signal TX is a filtered version of the OOK signal RF_OUT. The signal TX is generally a signal approximation of the signal RX. The block 108 may further buffer and filter the signals RF_OUT and TX.

The input block 102 generally comprises an antenna 130 that may receive the signal RX and that may be serially connected to a filter 132. The filter 132 may be serially connected to an amplifier 134. The filter 132 may be implemented as a band limit filter that is configured to pass the signal RX only within a predetermined frequency range. The amplifier 134 may be implemented as a gain block (or input buffer) that is configured to provide gain to and/or buffer the signal RX and, thereby, generate the signal RF_IN.

The controller block 104 generally comprises at least one storage device such as a digital radio frequency memory (DRFM) circuit (or block) 140, a baseband recovery (or detector) circuit (or block) 142, and a micro-controller/memory circuit (or block) 144 that may include a gain control circuit (or block) 146. The DRFM 140 may have an input 150 that may receive the signal RF_IN, an input 152 that may receive a signal (e.g., PLAY), an input 154 that may receive a signal (e.g., RECORD), and an output 156 that may present the signal RF_OUT.

The signals PLAY and RECORD are generally implemented as digital control signals as described below. The DRFM 140 is generally configured to determine and store a portion of the signal RF_IN, or a signal derived from the signal RF_IN and playback the stored signal (e.g., as the signal RF_OUT) in response to the signals RF_IN, PLAY, and RECORD.

The baseband recovery circuit 142 may have an input that may receive the signal RF_IN and an output that may present a signal (e.g., DATA). The signal DATA generally comprises the baseband data of the signal RF_IN. The signal DATA generally corresponds to the code that encodes the signal RF_IN. In one example, the signal DATA may be implemented as a binary signal. In another example (not shown), the signal DATA may be implemented as a continuous signal. The baseband recovery circuit 142 is generally configured to extract the baseband data (e.g., the signal DATA) from the signal RF_IN. The baseband recovery circuit 142 generally detects (i.e., demodulates, determines, etc.) the code that encodes the signal RF_IN (i.e., the signal DATA). The baseband recovery circuit 142 may be configured to generate the signal DATA in response to the signal RF_IN. When the signal DATA is implemented as a continuous signal, the baseband recovery circuit 142 generally includes an analog-to-digital converter (ADC) for converting the decoded analog signal into digital values.

The micro-controller 144 may have an input 170 that may receive the signal O_C, an input 172 that may receive the signal DATA, an output 174 that may present the signal PLAY, an output 176 that may present the signal RECORD, and an output that may present the signal CTRL. The micro-controller 144 generally comprises control logic configured (or operative) to control (or signal) the at least one operation of the transceiver 100. The baseband recovery circuit 142 and the micro-controller 144 are generally configured to identify, filter, decode and store at least one baseband signal DATA (i.e., detect the code that encodes the signal RF_IN) in response to the signals O_C and RF_IN during a sampling operation (or mode) of the transceiver 100.

The micro-controller 144 is generally configured to generate and assert the signal RECORD during the sampling mode. The micro-controller 144 generally does not present the signal RECORD unless a valid signal DATA is detected (i.e., the signal RF_IN has a valid encoding). The signal RECORD is then asserted for a period of time long enough to record (e.g., store) at least one portion of the carrier in the signal RF_IN. The micro-controller 144 is generally configured to generate and assert the modulating signal PLAY during a transmit operation (or mode) of the transceiver 100. The power control (or gain adjust) circuit 146 is generally configured to generate the signal CTRL in response to the signal DATA.

The output block 108 generally comprises an amplifier 190 that may have a signal input that may receive the signal RF_OUT, a control input that may receive the signal CTRL, and an output that may be serially connected to a filter 192. The filter 192 may be serially connected to an antenna 194. The antenna 194 generally presents (e.g., transmits, broadcasts, etc.) the signal TX. The amplifier 190 may be implemented as a controlled gain block that is configured to provide gain and modulation (i.e., control) to the signal RF_OUT and, thereby, generate the signal TX. The amplifier 190 may be configured to generate the signal TX in response to the carrier frequency signal RF_OUT and the amplitude control (or adjust) signal CTRL. Alternatively, the signal CTRL may control only the gain of an OOK AM signal RF_OUT. The amplifier 190 may be configured to adjust the signal RF_OUT gain as a function of (e.g., in response to) the signal duty cycle of a data code carried by TX.

The filter 192 may be implemented as a clean-up filter that is configured to limit the signal TX to a predetermined frequency range, and reduce or eliminate spurious components of the signal TX. The filter 192 may also be configured to transmit greater power at higher frequencies than at lower frequencies, or as otherwise required to provide the maximum output power permitted by regulations. This permits output power to be based on the spectral characteristics of TX without any knowledge of those characteristics by transceiver 100. Receive antenna 130 and transmit antenna 194 may be implemented as the same element or as separate antennae.

The present invention may be implemented in a variety of manners within the scope of the present invention. In one example, the blocks 140, 142 and 190 may be manufactured as a single integrated circuit (e.g., an application specific integrated circuit (ASIC) chip) or on a single circuit board. The single integrated circuit or single circuit board implementation of the blocks 140, 142 and 190 may provide a more robust (e.g., more resistant to breakage when dropped) transceiver 100 than conventional transceiver approaches. The single integrated circuit or single circuit board implementation of the blocks 140, 142 and 190 may have reduced area and cost when compared to conventional approaches. The controller 144 may be implemented as a microprocessor together with or separate from other elements of the system 100.

Figure 2:
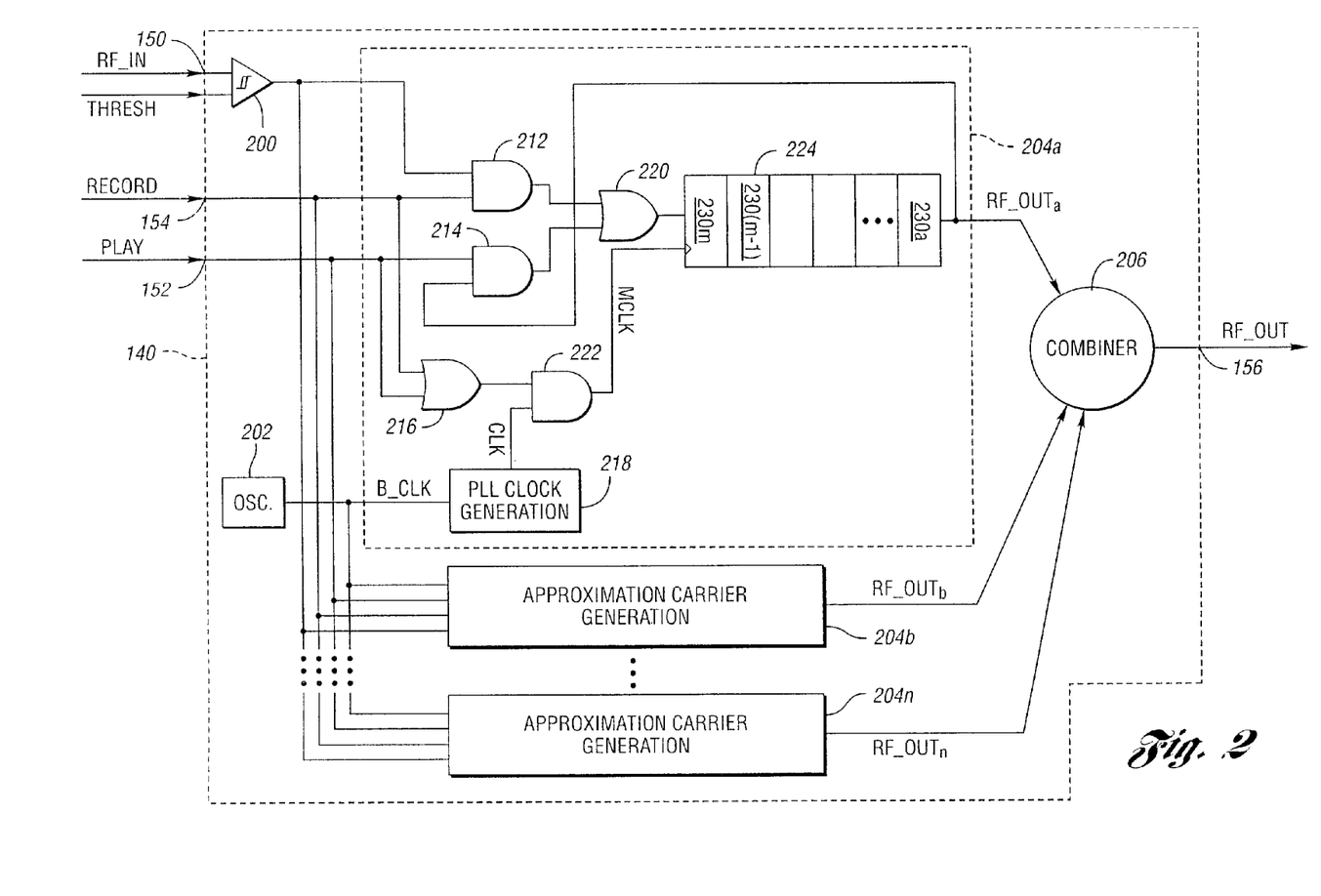
FIG. 2 is a diagram of a digital radio frequency memory of FIG. 1.

Referring to FIG. 2, a diagram illustrating an embodiment of the DRFM 140 is shown. The DRFM 140 generally comprises a comparator 200, an oscillator 202, at least one approximation carrier generation circuit 204 (e.g., circuits 204a–204n), and a combiner 206. Each circuit 204 generally comprises an AND gate 212, an AND gate 214, an OR gate 216, a phase locked loop (PLL) clock circuit 218, an OR gate 220, an AND gate 222, and a shift register (or buffer) 224. While the gates 212, 214, 216, 220, and 222 have been shown as specific types of logic gates, any appropriate logic gates may be implemented to meet the design criteria of a particular application.

The number of approximation carrier generation circuits 204 (i.e., the value of n) implemented in a particular design is generally determined by the level of widely spaced spurious emissions that are allowed in connection with the transmitter signal RF_OUT. Generally, the lower the allowed level of spurious emissions, the larger the value of n (i.e., the greater the number of circuits 204). Multiple (i.e., a plurality of) circuits 204 generally have outputs connected to the combiner 206. In addition, multiple circuits 204 may be independently controlled to save and generate carriers of differing frequencies for FM transmission.

The comparator 200 may have a first input that may receive the signal RF_IN, a second input that may receive a signal (e.g., THRESH), and an output that may be connected to a first input of each AND gate 212. The comparator 200 is generally used to change the analog signal RF_IN to a binary signal. The output of the comparator 200 is, thus, generally a pseudo-square wave signal having, on average, substantially the same fundamental frequency as the carrier frequency in the received signal RX (or the signal RF_IN). The signal THRESH may be implemented as a threshold level (or value). The threshold level THRESH may be selected (or determined) to be approximately an average of a DC level of the analog signal RF_IN. As such, the signal THRESH may ensure that the binary version of the signal RF_IN presented by the comparator 200 to each AND gate 212 is approximately a square wave.

In another example (not shown), the circuit 140 may be implemented without the comparator 200 and the signal THRESH. The signal RF_IN may be presented directly to the first input of each AND gate 212.

The AND gate 212 may have a second input that may receive the signal RECORD and an output that may be connected to a first input of the OR gate 220. The AND gates 214a–214n may have a first input that may receive the signal PLAY, a second input that may receive the signals RF_OUTa–RF_OUTn, respectively (or the signal RF_OUT as a feedback signal presented by the respective register 224), and an output that may be connected to a second input of the OR gate 220. The OR gate 216 may have first and second inputs that may receive the signals RECORD and PLAY, respectively, and an output that may be connected to a first input of the AND gate 222.

In one example, the oscillator 202 may be implemented as a crystal controlled oscillator. However, the oscillator 202 may be implemented as any appropriate clock to meet the design criteria of a particular application. The oscillator 202 may have an output that may present a base (or reference) clock signal (e.g., B_CLK) to an input of each respective PLL clock circuit 218. The PLL clock 218 may have an output that may present a signal (e.g., CLK). The PLL clock 218 may be configured to generate the signal CLK in response to the reference clock signal B_CLK. The signal CLK may have the same, a multiple of, or a dividend frequency relative to the frequency of the signal B_CLK.

The signal CLK may be implemented as a sampling clock signal. The signal CLK may be generated at an oversampling frequency relative to any expected carrier frequency of the signal RF_IN. The clock signals CLKa–CLKn generated within each respective circuit 204a–204n may be generated having substantially similar but not necessarily substantially the same frequency. The signals CLKa–CLKn may be generated having frequencies that differ within a range of, for example, 0% to 2%. The frequency of the signal CLK may be an over-sampling frequency. When the signal CLK has an over-sampling frequency, the clock signal CLK is typically generated at a frequency that is at least 2.5 times the highest expected carrier frequency of the signal RF_IN. For example, when the carrier frequency of the signal RF_IN is expected in the range of 300 MHZ–400 MHZ, the clock signal CLK may be generated at a frequency of 1.2 GHz. However, the clock signal CLK may be generated having any appropriate frequency to meet the design criteria of a particular application. For example, the signal CLK may be implemented as a sampling-frequency or under-sampling system clocking signal.

The output of the OR gate 220 may be connected to an input of the register 224. The signal presented by the OR gate 220 to the register 224 is generally a digitized representation of the signal RF_IN. The AND gate 222 may have a second input that may receive the signal CLK and an output that may present a clock signal (e.g., MCLK) to a clock input of the register 224. The shift register 224 is generally clocked (i.e., the signal RF_IN is generally sampled and held) at the frequency of the signal MCLK. The shift register 224 is generally configured to shift in samples of the signal RF_IN, store (or save) the samples of the signal RF_IN as a binary sequence, and shift out samples of the signal RF_IN (i.e., stored data) to generate and present the carrier approximation signal RF_OUT (e.g., signals RF_OUTa–RF_OUTn) in response to the clock signal MCLK.

Each shift register 224 generally comprises a plurality of storage fields (e.g., flip-flops, capacitors, or the like) 230a–230m, where m is a number of sufficient size such that at least one cycle of the carrier signal in RF_IN is generally sampled and held (or stored). However, typically more than one cycle is stored. The fields 230 may be configured to store (or hold) consecutive (or successive) bits of the digitized signal RF_IN in response to the clock signal MCLK. For example, in the case of the clock signal MCLK having a frequency of 1.2 GHz, a shift register 224 where m equals 3000 (i.e., having three thousand of the fields 230) may hold 2.5 µs of data of the signal RF_IN.

The combiner 206 is generally configured to combine the outputs of the circuits 204 (i.e., the signals RF_OUTa–RF_OUTn) to generate the signal RF_OUT. Since the signals CLKa–CLKn are generated via independent PLL clock circuits (i.e., the clocks 218a–218n), the signals CLKa–CLKn are generally phase locked to a common reference (i.e., the signal B_CLK). In one example, the combiner 206 may be implemented as a linear averager that is configured to average the respective clocked outputs of the registers 224a–224n substantially equally to generate the signal RF_OUT. In another example, the combiner 206 may be implemented as a weighted averager that is configured to average the respective clocked outputs of the registers 224a–224n per a predefined (e.g., binary, exponential, time-averaged, etc.) weighting to generate the signal RF_OUT. In yet another example, the combiner 206 may be implemented as a summer that adds the respective clocked outputs of the registers 224a–224m. However, the combiner 206 may be implemented as any appropriate circuit to meet the design criteria of a particular application.

The digitized signal RF_IN is generally clocked into the register 224 (e.g., sampled and held) in response to the control signal RECORD and the over-sampling clock signal MCLK during the sampling operation. The digitized, sampled signal RF_IN is generally shifted (or clocked) out of the register 224 as the signal RF_OUT in response to the control signal PLAY and the clock signal MCLK during the transmit (or normal) operation. Since the DRFM 140 generally samples and holds the digitized signal RF_IN and shifts out the signal RF_OUT in response to the over-sampling clock signal MCLK, the transceiver 100 is generally less prone to becoming de-programmed over time due to component aging and due to temperature sensitivity as in conventional approaches. The reduction or elimination of wait time from transmission of the signal TX from the time the signal O_C is presented may provide for more rapid programming of the transceiver 100 than conventional approaches. In addition, the signal PLAY may be used to directly generate an OOK signal (e.g., the signal TX) without having to modulate an existing carrier (e.g., by turning on and off the shifting out of the signal RF_OUT from the circuit 204).

Figure 3:
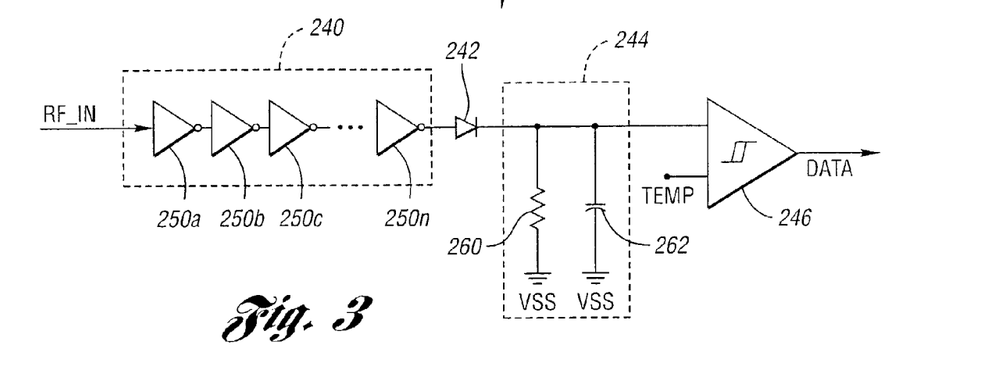
FIG. 3 is a diagram of a baseband data recovery circuit of FIG. 1.

Referring to FIG. 3, a diagram illustrating the baseband recovery block 142 is shown. The block 142 generally comprises a gain stage (or block) 240, a diode 242, a filter circuit (or block) 244, and a comparator 246 that are serially connected. The gain stage 240 generally receives and presents the signal RF_IN. The gain stage 240 generally comprises at least one CMOS inverter 250 (e.g., serially connected inverters 250a–250n), where n is a value such that the gain stage 240 provides sufficient amplification and successive inversion of the signal RF_IN to meet the design criteria of a particular application.

The diode 242 may have an anode terminal that may receive the signal RF_IN and a cathode terminal that may be connected to an input of the filter 244. The filter 244 generally comprises a resistance 260 and a capacitance 262. The resistance 260 and the capacitance 262 may each have a first terminal that may be connected to a first input (e.g., a data input) of the comparator 246 and a second terminal that may be connected to a ground potential (e.g., VSS).

The comparator 246 may have a second input (e.g., a threshold input) that may receive a signal (e.g., TEMP) and an output that may present the signal DATA. In one example, the comparator 246 may be implemented as a comparator having a temperature compensated threshold. The signal TEMP may be implemented as a temperature compensation threshold level. The trigger level of the comparator 246 as selected or determined via the signal TEMP is generally selected (e.g., via the micro-controller 144) to reduce or eliminate temperature effects and spurious noise from the signal DATA.

Figure 4:
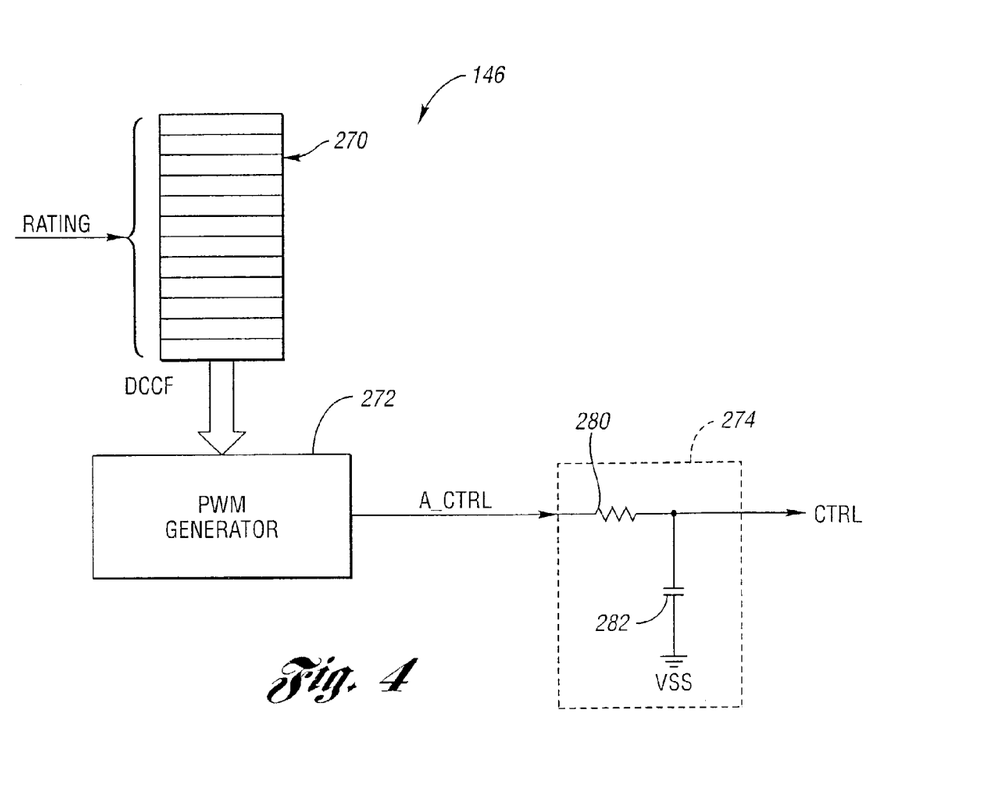
FIG. 4 is a diagram of a power output control circuit of FIG. 1.

Referring to FIG. 4, a diagram illustrating an embodiment of the power output control block 146 is shown. In one example, the power output control 146 comprises a look up table (LUT) 270, a pulse width modulation (PWM) generator 272, and a low pass filter (LPF) 274. However, the power output control block 146 may implement any appropriate power output control (i.e., modulation) circuitry to meet the design criteria of a particular application.

The LUT 270 may have an input that may receive a signal (e.g., RATING) and an output that may present a signal (e.g., DCCF). The LUT 270 is generally sized in proportion to the size of the signals DATA and DCCF (or the signal CTRL). For example, when the signal RATING is an x bit signal and the signal DCCF is a y bit signal, the LUT 280 may be implemented as a $2^x \times 2^y$ matrix. The signal RATING may be a duty cycle rating. The signal RATING may be determined (e.g., calculated) by the micro-controller 144 in response to the duty cycle of the signal RF_IN as represented by the signal DATA.

The signal DCCF is generally configured as an intermediate modulation signal to provide control of amplitude of the signal RF_OUT that corresponds to an inverse of the duty cycle of the data. The signal DCCF may be generated and presented via the LUT 270 in response to the signal RATING. Since the output block 108 may be frequency dependent, the system 100 may customize (e.g., match, optimize, etc.) the output of the power control block 146 (e.g., the signal CTRL) via values of the signal DCCF that are stored in the LUT 270.

The PWM generator 272 may have an input that may receive the signal DCCF and an output that may be connected to an input of the LPF 274. The PWM generator 272 may be configured to generate an intermediate PWM control signal (e.g., A_CTRL) in response to the signal DCCF. The LPF 274 may have an input that may receive the signal A_CTRL and an output that may present the signal CTRL. The LPF 274 may comprise a resistance 280 and a capacitance 282. The resistance 280 may have a first terminal that may receive the signal A_CTRL and a second terminal that may present the signal CTRL and may be connected to a first terminal of the capacitance 282. The capacitance 282 may have a second terminal that may be connected to the ground potential VSS. However, the LPF 274 may be implemented as any appropriate LPF to meet the design criteria of a particular application. The LUT 270, the PWM generator 272, and the filter 274 may be implemented as stand-alone circuits (not shown) or in connection with the controller 144.

Alternatively, the gain control 146 may be implemented within a microprocessor (e.g., the micro-controller/memory 144) with the signal CTRL generated via a digital to analog converter (DAC) where the output signal is proportional to the input duty cycle contained in the signal RF_IN or contained in a data code generated by controller 144. If the output TX is continuously amplitude modulated, the signal CTRL may also be used to modulate RF_OUT to produce TX.

As is readily apparent from the foregoing description, then, the transceiver 100 of the present invention provides an improved transceiver for implementation in such applications as home appliance remote control transceivers. The present invention may provide a transmitter and receiver (e.g., the transceiver 100) that generally implements a digital radio frequency memory (e.g., the DRFM 140). The transceiver 100 of the present invention may have reduced area and cost when compared to conventional approaches. Furthermore, the transceiver 100 may program more quickly, be more resistant to breakage when dropped, and be more stable over changes in temperature and time than conventional approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicular programmable transceiver system comprising:
   a programmable transceiver; and
   a digital radio frequency memory (DRFM) having at least one register, wherein the DRFM samples a carrier frequency signal of a radio frequency input signal, received by the transceiver while the transceiver is in a programming mode, in response to a clock signal which is enabled upon detection of a valid baseband data signal in the radio frequency input signal, holds the sampled carrier frequency signal in the at least one register, and shifts the sampled and held carrier frequency signal from the at least one register to the transceiver for the transceiver to transmit as part of a radio frequency output signal while the transceiver is in a transmit mode.

2. The system of claim 1 wherein the DRFM is configured to sample and hold the carrier frequency signal in response to at least one control signal during the programming operation of the transceiver.

3. The system of claim 2 wherein the transceiver comprises an output circuit configured to generate the radio frequency output signal in response to the transceiver receiving the sampled and held carrier frequency signal and an output control signal during the transmit operation of the transceiver.

4. The system of claim 1 wherein the clock signal has an over-sampling frequency compared to the carrier frequency signal.

5. The system of claim 1 wherein the DRFM comprises circuitry which outputs a square wave signal having a fundamental frequency substantially the same as the carrier frequency signal.

6. The system of claim 5 wherein the DRFM stores at least one binary sequence representing the square wave signal.

7. The system of claim 6 wherein the sampled and held carrier frequency signal is based on a combination of a plurality of binary sequences stored in the DRFM.

8. The system of claim 3 wherein the DRFM comprises a plurality of registers connected in parallel and each register is connected to a combiner configured to present the sampled and held carrier frequency signal to the transceiver.

9. The system of claim 3 wherein the transceiver further comprises a baseband recovery circuit configured to generate the baseband data signal in response to the radio frequency input signal.

10. The system of claim 9 wherein the transceiver further comprises a controller configured to generate the at least one control signal in response to at least one user interface signal.

11. The system of claim 9 comprising a controller configured to generate the output control signal in response to the baseband data signal.

12. The system of claim 10 wherein the transceiver further comprises an interface circuit configured to present the at least one user interface signal.

13. The system of claim 11 wherein the controller generates an intermediate control signal that corresponds to an inverse of the duty cycle of the baseband data signal and generates the output control signal in response to the intermediate control signal.

14. The system of claim 1 wherein the radio frequency output signal is filtered to adjust output power based on spectral characteristics of the radio frequency output signal.

15. For use in a home appliance remote control, a programmable transceiver system comprising:
   a programmable transceiver; and
   a digital radio frequency memory (DRFM) configured to hold samples of a carrier frequency signal of a radio frequency input signal received by the transceiver during a programming operation of the transceiver upon detection of a valid baseband data signal in the radio frequency input signal, and to shift the sampled and held carrier frequency signal to the transceiver during a transmit operation of the transceiver for the transceiver to transmit as part of a radio frequency output signal, wherein the sampled and held carrier frequency signal is shifted out of the DRFM in response to a clock signal.

16. The system of claim 15 wherein the transceiver is configured to generate the radio frequency output signal in response to receiving the sampled and held carrier frequency signal and an output control signal.

17. The system of claim 15 wherein the clock signal has an over-sampling frequency compared to the carrier frequency signal.

18. The system of claim 16 wherein the DRFM comprises a plurality of registers connected in parallel and each register is connected to a combiner configured to present the sampled and held carrier frequency signal to the transceiver.

19. The system of claim 16 wherein the transceiver comprises a baseband recovery circuit configured to generate the baseband data signal in response to the radio frequency input signal and an output circuit configured to generate the output control signal in response to the baseband data signal.

20. For use in a programmable transceiver, a method for generating an output signal, the method comprising:
sampling a radio frequency input signal received from a remote control transmitter upon detecting a valid baseband data signal in the input signal;
holding the sampled signal in at least one buffer;
shifting from the buffer a carrier signal; and
controlling an amplitude of the carrier signal to generate the transceiver output signal.

21. The method of claim 20 wherein on-off keyed signaling is generated by turning on and off the shifting from the buffer.

22. The method of claim 20 wherein sampling comprises over-sampling compared to a frequency of the input signal.

23. The method of claim 20 wherein the buffer comprises a plurality of registers connected in parallel and each register is connected to a combiner configured to generate the carrier signal.

24. The method of claim 20 wherein the method comprises generating the baseband data signal in response to the input signal, generating an output control signal in response to the baseband data signal, and controlling an amplitude of the carrier signal with the output control signal.

25. The method of claim 20 wherein the method comprises controlling the amplitude the carrier signal in response to an inverse of a duty cycle of the input signal.

26. The method of claim 20 wherein the method comprises determining an output power level of the output signal by filtering the output signal.

27. A method of remotely controlling a garage door opener that is remotely controlled by an existing transmitter, the existing transmitter transmitting a signal comprising a carrier modulated by a code, the method comprising:
receiving the signal;
detecting the code;
sampling the signal at a time determined by the detected code;
storing the sampled signal;
receiving a request to remotely control the garage door opener;
generating a carrier approximation by playing the stored sampled signal;
controlling an amplitude of the carrier approximation; and
transmitting the generated carrier approximation.

28. The method of claim 27 further comprising storing the detected code.

29. The method of claim 28 wherein the carrier amplitude is controlled based on the stored detected code.

30. The method of claim 27 wherein storing the sampled signal comprises storing the sampled signal in at least one shift register.

31. The method of claim 30 wherein generating a carrier approximation comprises shifting data out of the at least one shift register.

32. A programmable remote garage door opener comprising:
a receiver for receiving a received signal comprising a received carrier modulated with a received code;
a detector for detecting the received code in the received signal;
a transmitter for transmitting an output signal;
at least one register for holding a plurality of samples of the received signal; and
control logic operative to
(a) determine when the received code is detected,
(b) signal the at least one register to sample and store the received signal based on detecting the received code,
(c) receive a request to transmit a remote control command,
(d) signal the at least one register to present the stored signal to the transmitter, and
(e) signal the transmitter to control an amplitude of the stored signal presented by the at least one register thereby generating the output signal.

33. A programmable remote garage door opener as in claim 32 wherein the control logic is further operative to store the detected received code.

34. A programmable remote garage door opener as in claim 33 wherein the control logic signals the transmitter based on the stored code.

35. A programmable remote garage door opener as in claim 32 wherein the generated signal operates a garage door opener.

36. A programmable remote garage door opener as in claim 32 wherein the generated signal operates at least one light.

37. A programmable remote garage door opener as in claim 32 wherein the generated signal operates at least one appliance.

* * * * *